Nov. 11, 1969  A. C. A. SAUNDERS  3,477,909
NUCLEAR REACTOR FUEL ELEMENT ASSEMBLIES
Filed April 18, 1968  3 Sheets-Sheet 3

United States Patent Office 3,477,909
Patented Nov. 11, 1969

3,477,909
NUCLEAR REACTOR FUEL ELEMENT ASSEMBLIES
Alan Charles Anthony Saunders, Hale, England, assignor to United Kingdom Atomic Energy Authority, London, England
Filed Apr. 18, 1968, Ser. No. 722,347
Claims priority, application Great Britain, May 15, 1967, 22,531/67
Int. Cl. G21c 3/30
U.S. Cl. 176—78          5 Claims

ABSTRACT OF THE DISCLOSURE

A nuclear reactor fuel element assembly has a cluster of parallel fuel elements which are spaced apart by cellular grids. The cells of the grids are off-set from their nominal positions about the longitudinal axis of the cluster to ensure that each grid bears against each element. The cells are arranged in two groups off-set in opposite directions so that turning moments on the grid are balanced.

BACKGROUND OF THE INVENTION

This invention relates to nuclear reactor fuel element assemblies of the kind including a cluster of parallel, elongate fuel elements.

Where the fuel elements of a cluster are long it is common to brace them apart by a cellular grid or grids disposed at intervals along the cluster. The grids may be manufactured economically in large numbers by machining from plate material but because of the manufacturing tolerances allowed and an allowance for swelling of the fuel element the cells are made slightly over size with the result that it is possible for a fuel element to pass through one or more grids entirely free of bracing effort. This condition can cause fretting, that is, surface damage due to vibrational and sliding contact between the fuel element and grid. To avoid this condition it has been proposed angularly to off-set the grids from a nominal position about the longitudinal axis of the cluster, alternate grids being off-set in opposite directions so that the corresponding cells of alternate grids are out of alignment thereby causing each fuel element to bear on one side of each cell. However, because of the additive reaction forces of the fuel elements, the grids—necessarily flimsy because of the need for neutron economy—are distorted and a central tubular member connecting the grids is subject to torsional stress.

SUMMARY OF THE INVENTION

According to the invention in a nuclear reactor fuel element assembly comprising a cluster of parallel, elongate fuel elements, means in an end region of the cluster for locating the elements in spaced array, and a cellular bracing grid, cells of the grid, each containing a fuel element, are arranged in groups and the axes of the cells of two groups are angularly displaced relative to the normal spaced array of the fuel element axes, the displacement of the two groups of cells being in opposed directions about the longitudinal axis of the cluster and of magnitude such that the turning moments on the grid due to the reaction forces of the fuel elements in one of the two groups of cells is substantially balanced by the turning moments due to reaction forces of the fuel elements in the other of the two groups of cells.

In a perferred construction the fuel elements are located in spaced array at each end of the cluster by end supports and there is a plurality of bracing grids disposed at intervals between the end supports, each grid having displaced groups of cells, and alternate grids in the assembly are face reversed relative to their adjacent grids so that, whilst all the fuel elements are braced in passage through the cells of the grids, all the grids are identical in form.

DESCRIPTION OF THE DRAWINGS

Nuclear reactor fuel element assemblies embodying the invention will now be described by way of example with reference to the accompanying drawings wherein.

DESCRIPTION OF THE PREFERRED EMBODIMENTS

Figure 1:
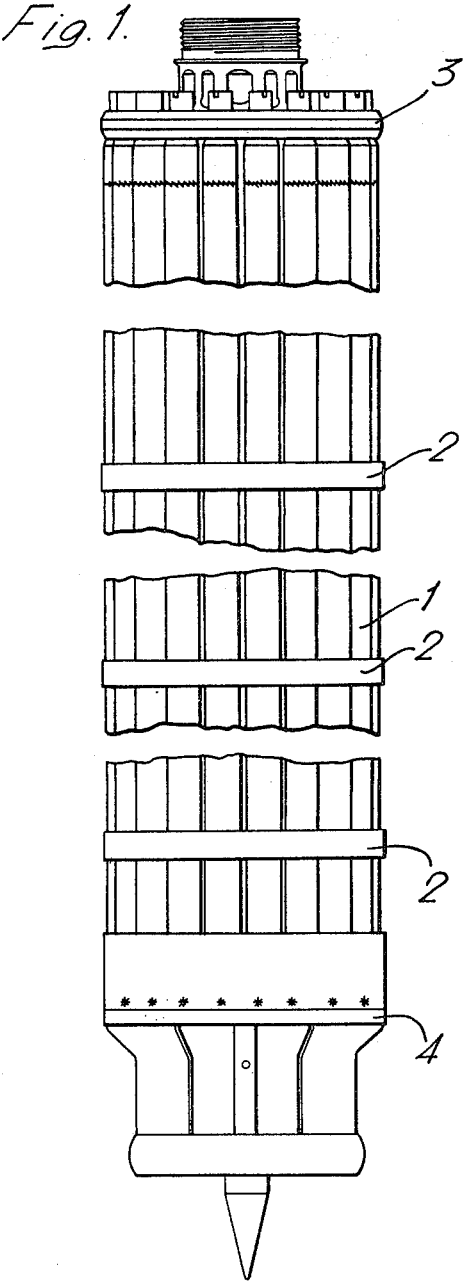
FIGURE 1 is a fragmentary side view of a fuel element assembly.
Figure 2:
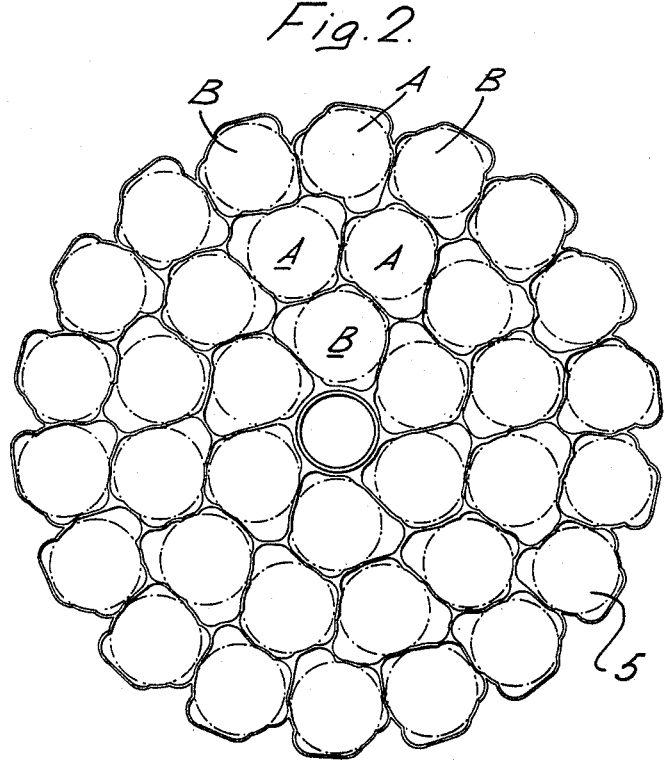
FIGURE 2 is a plan view of a cellular bracing grid.
Figure 3:
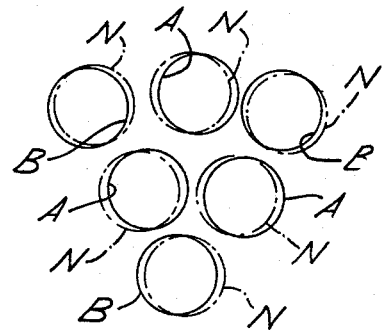
FIGURE 3 is a diagrammatic illustration of the grouping of cells of the grid shown in FIGURE 2.

Referring to the drawings, there is shown in FIGURE 1 a nuclear reactor fuel element assembly comprising a cluster of spaced, parallel, elongate fuel elements 1 with cellular bracing grids 2 disposed at intervals between end supports 3 and 4. The end supports locate the fuel elements in a spaced array of annular rows. The grids 2 are shown in detail in FIGURE 2 and the cells 5 are arranged in two groups designated A and B shown diagrammatically in FIGURE 3 (only one 60° sector is shown). The axes of the cells of the groups A and B are angularly displaced relative to the normal spaced array of the fuel element axes. The cell boundaries are shown in full line in FIGURE 3 whilst the normal spaced array position of the fuel elements is shown in broken line. The displacement of the cells in group A is in clockwise direction (as viewed in FIGURE 2) whilst that of the cells of group B is in counter clockwise direction.

The radial pitching of the annuli of cells is at substantially equal intervals so that, assuming the reaction forces of the fuel elements are equal, the sum of the turning moments due to the fuel elements in the group A of cells is substantially equal to that of the fuel elements in the group B of cells.

Whilst all the grids are identical in form, alternate grids in the assembly are face reversed relative to their adjacent grids so that the group of cells A of one grid is displaced oppositely in angular direction to the group of cells A of the adjacent grid.

The grids are machined from .375" thick stainless steel and their peripheries are concyclic with a 5.050" diameter circle. The grid has thirty six cells for fuel elements located in three concentric annular rows. The cells have irregular contours to reduce the amount of neutron absorbing material and to give a large flow path for coolant through the grids. Each cell defining contour provides three bearing surfaces for fuel elements the bearing surfaces being concyclic with 0.700" diameter circles. The displacement of the cells from the normal positions of the fuel elements is within the range 0.010" to 0.015". The fuel elements comprise sheathed stacks of uranium dioxide pellets which are enriched in the isotope U 235.

Figure 4:
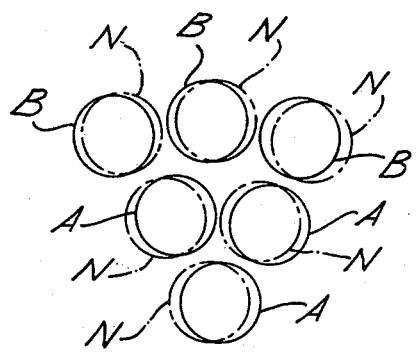
FIGURE 4 is a diagrammatic illustration of the grouping of a grid for a second construction of nuclear reactor fuel element assembly.

In a second construction of nuclear reactor fuel element assembly the fuel elements comprise sheathed stacks of uranium dioxide pellets having only the natural content of the isotope U 235. The fuel elements are required to be separated by spaces only .030" wide so it is not feasible to displace adjacent cells by a distance of the order of .015" so that they approach each other by .030". In this case the displacements, as shown diagrammatically in FIGURE 4, consist in .015" displacement in clockwise direction for a group A comprising two inner annuli of cells and a lesser displacement in counter clockwise direction for the outer annular group B of cells so that the turning moments due to the outer annulus of fuel elements are substantially balanced by the turning moments of the inner annuli of elements. Although this balance is achieved by permitting unequal reaction forces in cells in groups A and B, substantially no turning moment is transmitted to adjacent grids and distortion of the grid is less than if all the cells were displaced in the same direction.

I claim:

1. A nuclear reactor fuel element assembly comprising:
   a cluster of elongate fuel elements,
   means for locating said elements in spaced, parallel array, and
   at least one bracing grid having cells each containing one of said elements, said cells being arranged in groups with cell axes of two of said groups angularly displaced from the normal spaced array of said elements, the displacement of said two groups being in opposed directions about the longitudinal axis of the cluster and of magnitude such that the turning moments on the grid due to reaction forces of the fuel elements in one group of said two groups of cells is substantially balanced by the turning moments due to reaction forces of the fuel elements in the other of said two groups of cells.

2. A nuclear reactor fuel element assembly according to claim 1, having means for locating said elements in spaced, parallel array at each end of said cluster, and one or more of said bracing grids being disposed between said means.

3. A nuclear reactor fuel element assembly according to claim 2, having a plurality of bracing grids, alternate grids being face reversed so that corresponding groups of cells of adjacent grids are displaced in opposite directions.

4. A nuclear reactor fuel element assembly according to claim 3, wherein the angular displacements of said groups are of unequal magnitude.

5. A nuclear reactor fuel element assembly according to claim 4, wherein the spaced array consists in concentric rows of fuel elements arranged about the longitudinal axis of the cluster and the cells of the grids form inner and outer groups of angularly displaced cells.

References Cited

UNITED STATES PATENTS

| | | | |
|---|---|---|---|
| 3,281,327 | 10/1966 | Webb et al. | 176—78 X |
| 3,366,546 | 1/1968 | Anthony et al. | 176—78 X |

CARL D. QUARFORTH, Primary Examiner

MELVIN J. SCOLNICK, Assistant Examiner